(12) United States Patent
Sakakibara et al.

(10) Patent No.: US 6,338,696 B1
(45) Date of Patent: Jan. 15, 2002

(54) LOCK-UP CONTROL DEVICE FOR A TORQUE CONVERTER

(75) Inventors: Satoshi Sakakibara, Yamato; Akihiro Ueki, Isehara, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/551,661

(22) Filed: Apr. 18, 2000

Related U.S. Application Data (63) Continuation of application No. 09/176,021, filed on Oct. 21, 1998.

(30) Foreign Application Priority Data

Oct. 27, 1997 (JP) .............................................. 9-294212

(51) Int. Cl.[7] .............................................. B60K 41/02
(52) U.S. Cl. ........................ 477/175; 477/174; 477/168
(58) Field of Search ................................. 477/166, 168, 477/169, 174, 175, 62, 64, 65; 701/67, 68

(56) References Cited

U.S. PATENT DOCUMENTS

| 4,516,671 A | 5/1985 | Nishikawa et al. |
| 4,580,671 A | 4/1986 | Matsuoka et al. |
| 4,595,088 A | 6/1986 | Sugano |
| 5,086,889 A | 2/1992 | Nobumoto et al. |
| 5,086,894 A | 2/1992 | Iizuka et al. |
| 5,143,191 A | 9/1992 | Nobumoto et al. |
| 5,265,017 A | 11/1993 | Kaya et al. |
| 5,507,372 A | 4/1996 | Boardman et al. |
| 5,520,594 A | 5/1996 | Fukasawa et al. |
| 5,535,863 A | 7/1996 | Vukovich et al. |
| 5,616,100 A | 4/1997 | Sakai et al. |
| 5,620,394 A | 4/1997 | Iizuka |
| 5,787,379 A | 7/1998 | Ochiai et al. |
| 5,957,255 A | 9/1999 | Grytzelius et al. |
| 6,152,852 A | * 11/2000 | Sakakibara et al. ......... 477/175 |

FOREIGN PATENT DOCUMENTS

JP 8-233098 9/1996

* cited by examiner

*Primary Examiner*—Charles A. Marmor
*Assistant Examiner*—Saúl Rodriguez
(74) *Attorney, Agent, or Firm*—McDermott, Will & Emery (57) ABSTRACT

A lock-up controller is provided for shifting a torque converter of a vehicle from the lock-up state to the unlock state when the accelerator pedal is depressed at a speed larger than a predetermined speed when the vehicle is coasting. The controller is further functioning to prevent the torque converter from shifting to the lock-up state when the torque converter has been shifted to the unlock state and the vehicle speed is within the predetermined re-lock-up prevention speed range so as to avoid frequent lock-up/unlock operation of the torque converter.

6 Claims, 6 Drawing Sheets

LOCK-UP CONTROL DEVICE FOR A TORQUE CONVERTER

This application is a continuation of application Ser. No. 09/176,021, filed Oct. 21, 1998.

FIELD OF THE INVENTION

The present invention relates to a lock-up control of a torque converter, used in the automatic transmission system of a vehicle.

BACKGROUND OF THE INVENTION

Torque converters carry out the functions of absorbing torque fluctuations or increasing torque in order to transmit the motive force between the input/output elements through a fluid.

Since their transmission efficiency is lower than the conventional friction clutch, during running conditions where absorbing torque fluctuations or increasing torque are not necessary, the input/output elements of the torque converter are directly connected and put in a lock-up state.

In vehicles provided with an automatic transmission and a torque converter equipped with such a lock-up clutch, the torque converter is generally put in the lock-up state during coast running in order to increase the fuel cut period.

However when shifting from coast running to power running by depressing the accelerator pedal while the torque converter is maintained in the lock-up state, the torque converter may experience a torque shock due to sudden increase of input torque.

In order to suppress this torque shock, Tokkai Hei, 8-233098 published in 1996 by the Japanese Patent Office discloses the unlocking of the torque converter when shifting from coast running to power running is performed.

However in this conventional technique, if shifting between coast running and power running is frequently repeated during driving, the torque converter will be repeatedly locked up and unlocked. Thus the clutch facing of the lock-up clutch will soon wear out and this will adversely affect to the durability of the torque converter.

SUMMARY OF THE INVENTION

It is therefore an object of this invention to avoid frequent lock-up and unlock of the torque converter, while also avoiding torque shock when shifting from coast running to power running.

In order to achieve the above object, this invention provides a lock-up control device for a torque converter in a vehicle. The torque converter comprises an input element connected to an engine which rotates according to a depression of an accelerator and an output element connected to an automatic transmission. The lock-up control device comprises a sensor for detecting a depression degree of the accelerator, a sensor for detecting a vehicle speed, and a microprocessor programmed to determine whether or not the vehicle is coasting based on the depression degree of the accelerator, determine whether or not the torque converter is in a lock-up state wherein the input and output elements are directly combined, calculate an accelerator depression speed from the depression degree of the accelerator, shift the torque converter to an unlock state in which the input and output elements are indirectly combined when the vehicle is coasting, the torque converter is in the lock-up state, and the accelerator depression speed is larger than a predetermined speed, determine whether or not the vehicle speed is within a predetermined re-lock-up prevention speed range, and prevent the torque converter from shifting to the lock-up state when the torque converter has been shifted to the unlock state and the vehicle speed is within the predetermined re-lock-up prevention speed range.

When the engine comprises a throttle which operates according to the depression of the accelerator, it is preferable that the accelerator depression degree sensor comprises a sensor for detecting an opening of the throttle.

It is also preferable that the microprocessor is further programmed not to shift the torque converter to the lock-up state when the vehicle speed is less then the predetermined re-lock-up prevention speed range irrespective of the accelerator depression speed.

It is also preferable that the microprocessor is further programmed to learn an average speed of the accelerator depression from coasting of the vehicle, and modify the re-lock-up prevention speed range to a larger range when the average speed is larger than a standard value.

In this case, it is further preferable that the microprocessor is further programmed to set the larger range by modifying an upper limit of the re-lock-up prevention speed range to a larger value.

It is also preferable that the microprocessor is further programmed to set the larger range by modifying a lower limit of the re-lock-up prevention speed range to a smaller value.

It is also preferable that the microprocessor is further programmed to calculate a time elapsed from when the torque converter was shifted from the lock-up state to the unlock state, and allow the torque converter to shift to the lock-up state when the elapsed time has reached a set time even when the vehicle speed is within the predetermined re-lock-up prevention speed range.

In this case, it is further preferable that the microprocessor is further programmed to learn an average speed of the accelerator depression from coasting of the vehicle, and modify the set time to a longer time when the average speed is larger than a standard value.

The details as well as other features and advantages of this invention are set forth in the remainder of the specification and are shown in the accompanying drawings.

DESCRIPTION OF THE PREFERRED EMBODIMENTS

Figure 1:
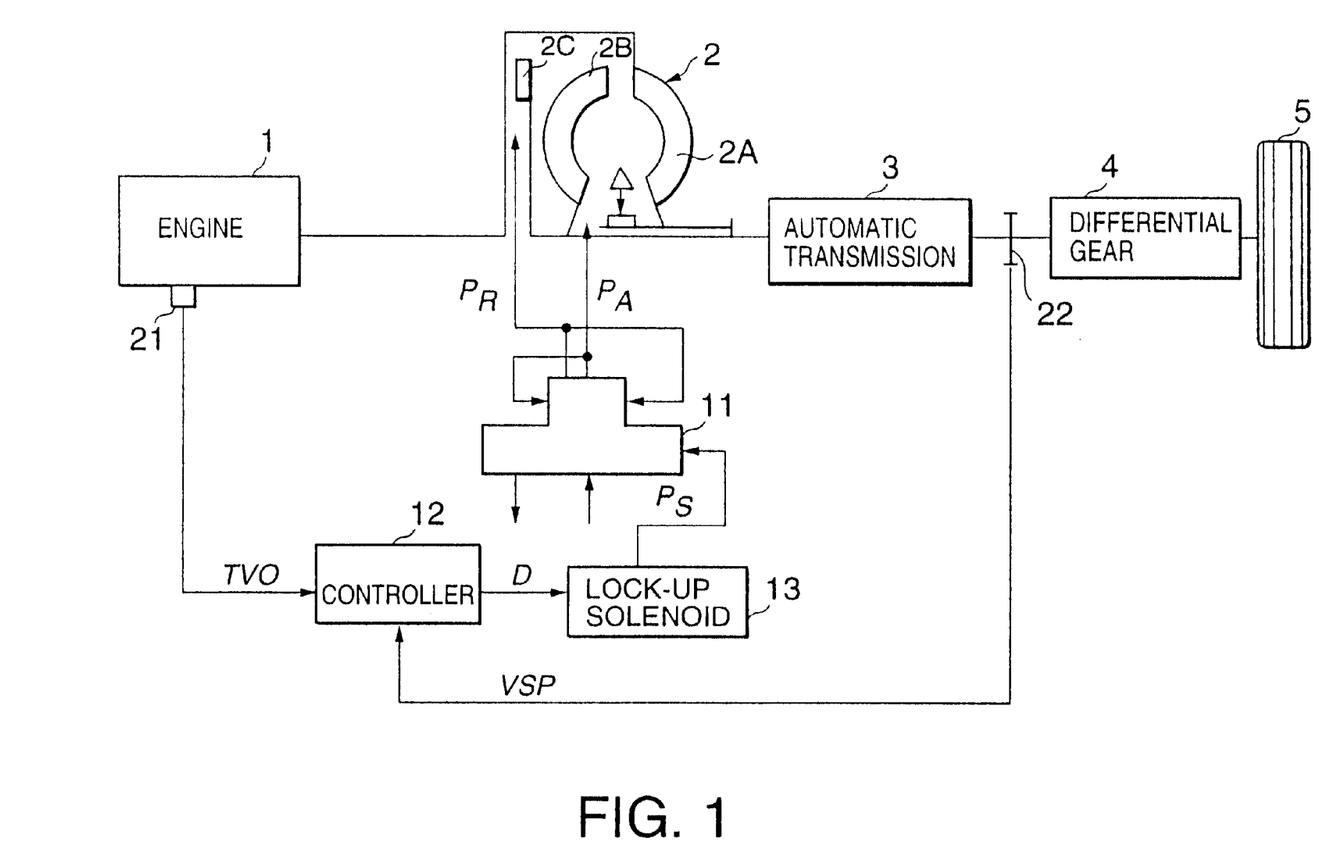
FIG. 1 is a schematic diagram of a torque converter and a control device therefor according to this invention.

Referring to FIG. 1 of the drawings, an engine 1 is connected to an automatic transmission 3 via a torque converter 2. An output torque of the transmission 3 is transmitted to vehicle wheels 5 via a differential gear 4.

The a torque converter 2 comprises a pump impeller 2A connected to a rotating axis of the engine 1, a turbine runner 2B connected to an input axis of the transmission 3 and a lock-up clutch 2C which combines the pump impeller 2A and the turbine runner 2B in a lock-up state. In this state, the torque is directly transmitted from the pump impeller 2A to the turbine runner 2B. When the lock-up clutch 2C is in an unlock state, the torque is transmitted by fluid sealed in a space between the pump impeller 2A and the turbine runner 2B. In this state the pump impeller 2A and the turbine runner 2B can slip with respect to each other.

The force for locking up the lock-up clutch 2C is determined by the differential pressure of the applied pressure $P_A$ and the release pressure $P_R$. If the applied pressure $P_A$ is lower than the release pressure $P_R$, the lock-up clutch 2C is in the unlock state. If the applied pressure $P_A$ is greater than the release pressure $P_R$ and the resultant differential pressure is greater than a predetermined value, the lock-up clutch 2 is in the lock-up state. The applied pressure $P_A$ and the release pressure $P_R$ are controlled by a control system described below.

Figure 2:
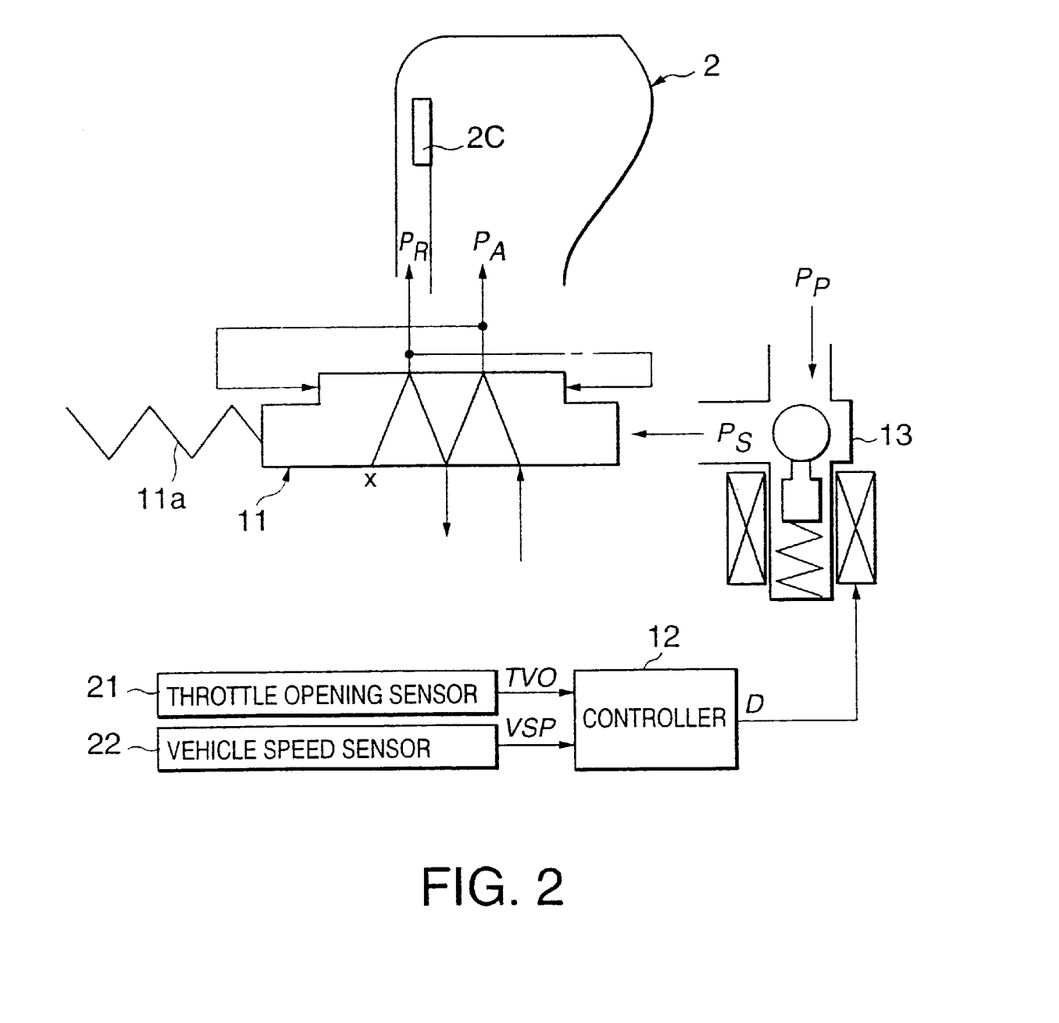
FIG. 2 is an enlarged view of essential parts of FIG. 1.

A lock-up control valve 11 provides the applied pressure $P_A$ and the release pressure $P_R$ on the basis of the signal pressure $P_S$ from a lock-up solenoid 13. The lock-up solenoid 13 generates the signal pressure $P_S$ according to a signal D output from a controller 12, this signal changing over between ON and OFF. The construction of the lock-up control valve 11 and the lock-up solenoid 13 is shown in FIG. 2, which is known in the art.

The lock-up solenoid 13 uses a fixed pilot pressure $P_P$ as a base pressure and generates the signal pressure $P_S$ according to the signal D from the controller 12.

The lock-up control valve 11 comprises a spool which receives the release pressure $P_R$ and the above signal pressure $P_S$ in one direction and the applied pressure $P_A$ and force of the spring 11A in the other direction. When the signal pressure $P_S$ is high, the applied pressure $P_A$ is also high and if the differential pressure $(P_A-P_R)$ is greater than the force required for the lock-up of the lock-up clutch 2C, the torque converter is placed in the lock-up state.

On the other hand, when the signal pressure $P_S$ is low, the differential pressure $(P_A-P_R)$ is less than the force required for the lock-up, the lock-up control valve 11 releases the lock-up clutch 2C.

As shown in FIGS. 1 and 2, a signal from a throttle opening sensor 21 which detects a throttle opening TVO of the engine 1 and a signal from a vehicle speed sensor 22 which detects the vehicle speed VSP are inputted into the controller 12.

The controller 12 comprises a microcomputer which has a central computing unit (CPU), a read only memory (ROM), a random access memory (RAM) and an input/output inter face (I/O interface).

Figure 3:
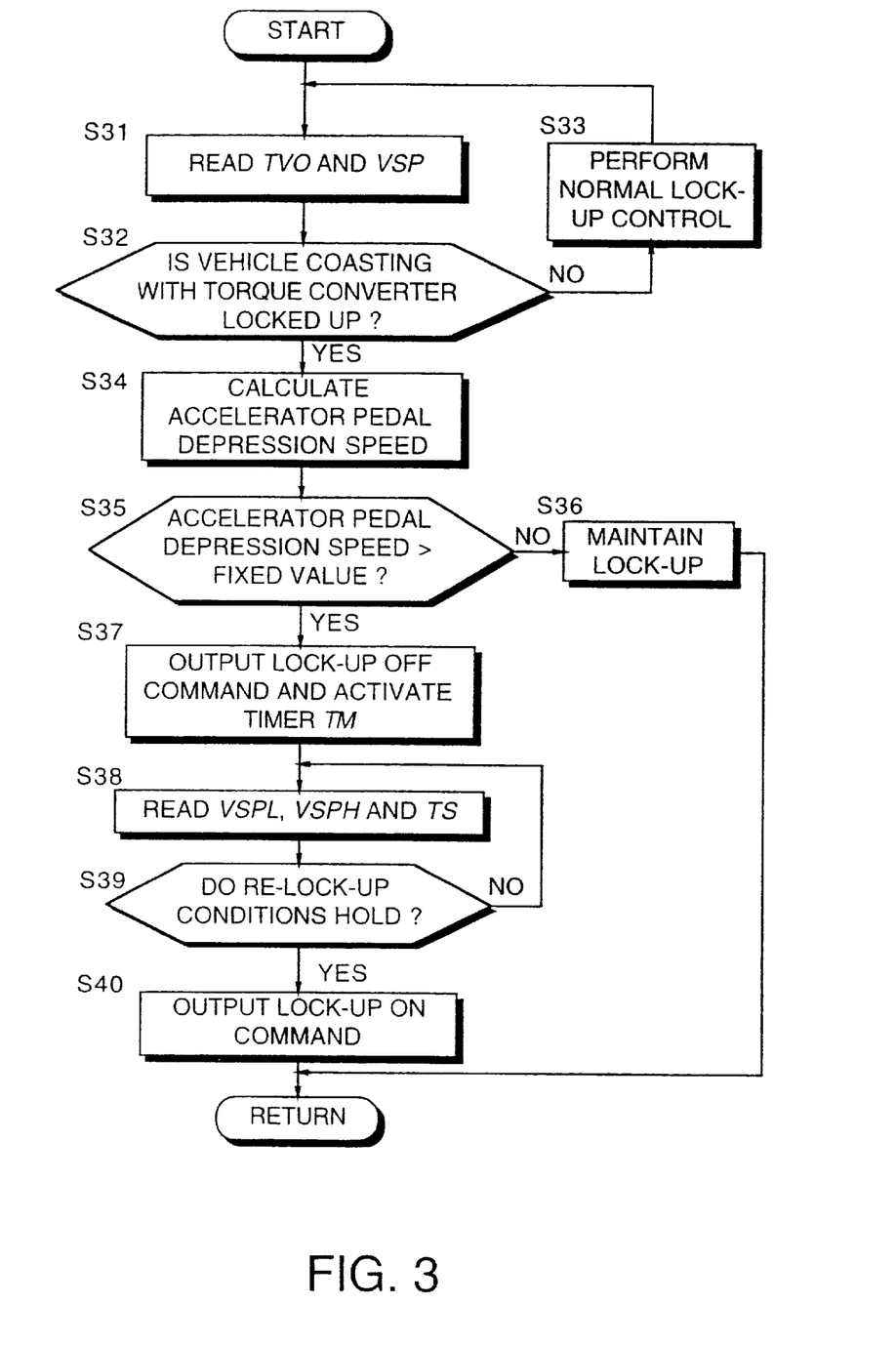
FIG. 3 is a flow chart describing a lock-up control process performed by a controller according to this invention.

The controller 12 conducts a lock-up control process shown in FIG. 3 on the basis of the above input signals. This process is performed at a fixed interval.

First, in a step the throttle opening TVO and the vehicle speed VSP are read. Then it is determined in a step S32 if the lock-up clutch 2C is in the lock-up state used while the vehicle is in the coast running. When the result is negative, normal lock-up control is carried out in a step S33. Normal lock-up control is explained as follows.

Figure 6:
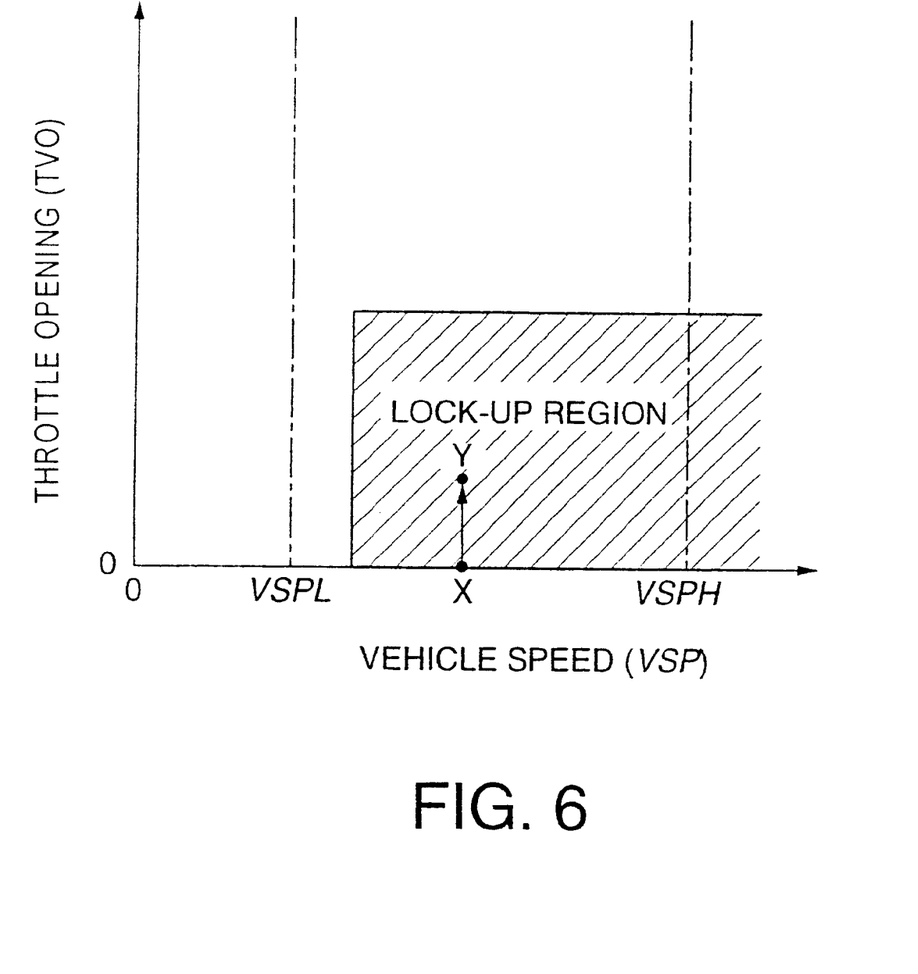
FIG. 6 is a diagram showing a lock up region of the torque converter and a vehicle speed region for preventing re-lock-up of the converter according to this invention.

On the basis of the throttle opening TVO and the vehicle speed VSP, it is determined whether the vehicle running condition is in a lock-up region or unlock region by referring to a map shown in FIG. 6. When in the unlock region, the signal D is OFF and as a result the lock-up clutch 2C is unlocked. When in the lock-up region, the signal D is ON, and as a result the lock-up clutch 2C is locked up.

The state in which the lock-up clutch 2C is locked up while the vehicle is in the coast running is distinguished by the fact that the throttle opening TVO is 0 while the vehicle speed VSP is not 0.

When the above lock-up/coast running condition has been detected in the step S32, the process proceeds to a step S34.

In the step S34, the difference of the current throttle opening TVO and that of the immediately preceding occasion when the process was performed $TVO_{31}$ is computed. The result is then divided by the interval of the process execution so as to obtain a throttle operating speed, which corresponds to an accelerator pedal depression speed.

In a next step S35, it is determined whether or not the accelerator pedal depression speed above is higher than a fixed value. If the accelerator pedal depression speed is higher than the fixed value, it is determined that the lock-up clutch 2C should be unlocked and the process proceeds to a step S37. If on the other hand the accelerator pedal depression speed is equal to or less than the fixed value, the lock-up clutch 2C is maintained in the lock-up state in a step S36 and the process terminates without performing further steps.

In the step S37, the command signal D is turned to be OFF, the lock-up clutch 2C is unlocked, and at the same time a timer TM which measures time elapsed from this unlock operation is activated.

In a step S38, as shown in FIG. 6, preset vehicle speeds VSPL and VSPH as well as set time TS are read.

The preset vehicle speeds are used to determine the vehicle speed range in which re-lock-up should be prevented until the elapsed time from the unlock operation reaches the set time TS.

The upper limit of vehicle speed VSPH corresponds to the lower limit of a vehicle speed range which does not cause torque shock problems due to shifts from coast running to power running.

The lower limit of vehicle speed VSPL corresponds to the upper limit of a vehicle speed range in which the lock-up clutch 2C is not locked-up in coast running.

As far as the vehicle is driven in the vehicle speed range between VSPL and VSPH, re-lock-up is prevented until the time elapsed after the unlock operation of the lock-up clutch 2C reaches the set time TS. The set time TS is determined beforehand as an allowable period of time during which fuel consumption and noise will not become problems, even if re-lock-up is not performed after the shift to power running which has accompanied the unlock operation of the lock-up clutch 2C.

In a step S39, it is determined whether or not to allow re-lock-up on the basis of the following conditions: whether or not the vehicle speed VSP is in the vehicle speed range between the vehicle speeds VSPL, VSPH, or whether the timer TM, which measures the elapsed time from the release of lock-up due to the shift to power running, has exceeded set time TS.

The speed range below the lower limit vehicle speed VSPL is the range where lock-up of the torque converter is not performed, so re-lock-up is not allowed in this range irrespective of the accelerator pedal depression speed.

If re-lock-up is not allowed, the process repeats the steps S38 and S39 until re-lock-up is allowed. When the conditions allowing re-lock-up are satisfied, the process proceeds to step S40 and outputs a lock-up ON command so as to place the torque converter in the lock-up position.

In this embodiment, for example when the shift is made by quickly depressing the accelerator pedal from coast running in the lock-up state at point X in FIG. 6 to power running at point Y in the same figure, the torque converter is released from the lock-up, and the generation of torque shock due to sudden increase of the input torque to the torque converter 2 is thereby prevented.

When this input torque increase is stopped, re-lock-up of the torque converter 2 is not performed until the vehicle speed VSP moves out of the speed range between VSPL and VSPH, or the elapsed time from the release of lock-up reaches the set time TS. Therefore, even if coast running and power running are alternated at short intervals, the torque converter 2 is maintained in the unlock state.

Therefore problems with respect to the durability of the clutch facing of the lock-up clutch 2C suffering early wear due to being turned ON and OFF frequently is avoided.

On the other hand, when the vehicle speed VSP has moved out of the above speed range or when the elapsed time has reached the set time TS, the prevention of re-lock-up is released and the torque converter may be locked up again. Hence, increase of fuel consumption due to the continuation of the unlock state over a long period is also avoided.

Figure 4:
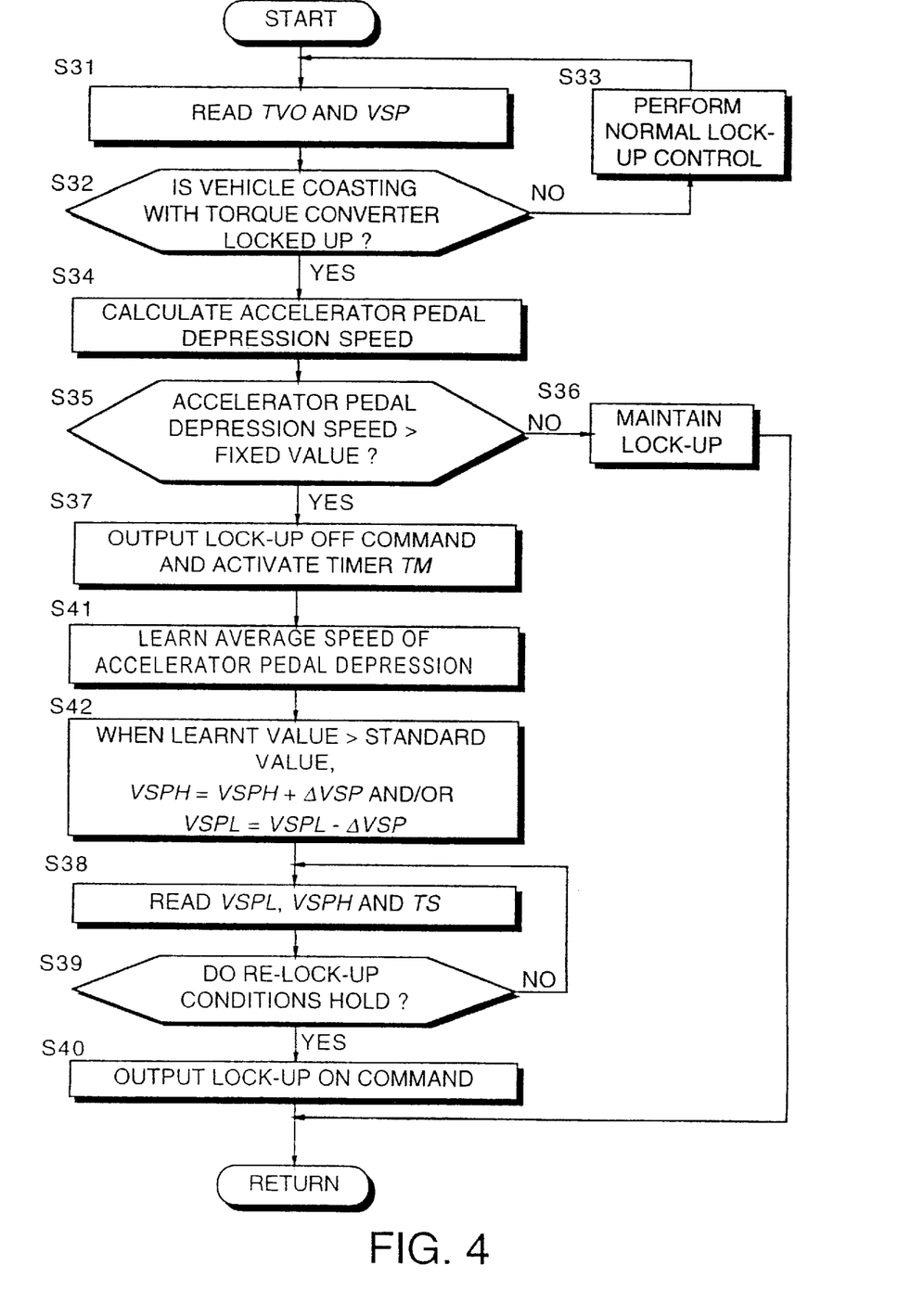
FIG. 4 is similar to FIG. 3, but showing a second embodiment of this invention.

FIG. 4 shows a second embodiment of this invention.

In this embodiment, the upper and lower limits of vehicle speed VSPH and VSPL, which determine the vehicle speed range for preventing re-lock-up, are set by learning the habits of the driver in accelerator pedal operation. That is to say, it is based on whether the driver has a tendency to repeat coasting and power running which leads to problems of wear and tear.

In FIG. 4, steps S41 and S42 are added between steps S37 and S38 in the flowchart of FIG. 3.

In the step S41, the pattern of the driver's operation when depressing the accelerator pedal from coast running to power running is learned. This includes the learning of the average degree of depression of the accelerator pedal during a shift period from coast running to power running. If this value is large, it is determined that the driver has a tendency to repeat coasting and power running and hence the clutch facing of the torque converter will soon wear out.

In the next step 42, the learnt value is compared with a predetermined standard range. When the learnt value is larger than the predetermined standard range, the lower limit of vehicle speed VSPL is lowered by ΔVSP, and the upper limit of vehicle speed VSPH is raised by ΔVSP. When the learnt value is within the standard range, the lower limit VSPL and upper limit VSPH are unchanged.

As a result, on the basis of the pattern of the driver's operation of depressing the accelerator pedal, the vehicle speed range for preventing re-lock-up is enlarged depending on the speed with which the driver depresses the accelerator pedal. Hence the frequency with which the vehicle speed VSP moves out of that range decreases. Therefore even for drivers with a tendency to often repeat shifts between coasting and power running, durability problems of the clutch facing can be avoided.

Figure 5:
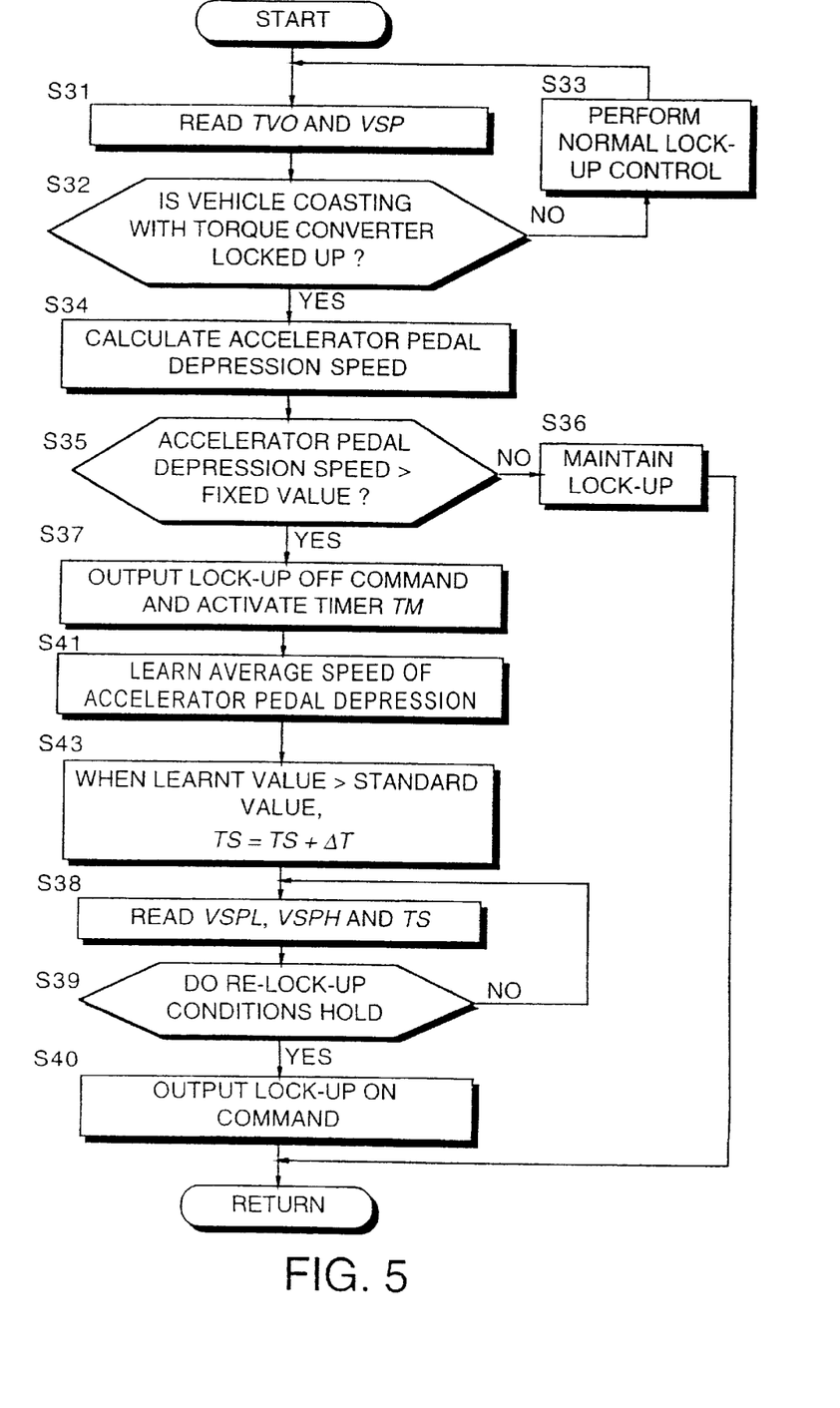
FIG. 5 is similar to FIG. 3, but showing a third embodiment of this invention.

FIG. 5 shows a third embodiment of this invention.

In this embodiment, the set time TS is determined according to the learnt value corresponding to the habits of the driver in depressing the accelerator pedal. In this context, a step S43 is substituted for step S42 of FIG. 4.

Step S41 which is the prior step to the step S43 is identical to that of FIG. 4.

In the step S43, once it is determined that the learnt value is larger than the predetermined standard range, the set time TS is lengthened by ΔT, and in the subsequent step S38, the lengthened set time TS is read.

According also to this embodiment, even when the driver has a tendency to frequently repeat shifts between coast running and power running, durability problems of the clutch facing can be avoided.

In the second and third embodiments, either of set vehicle speeds VSPL, VSPH or set time TS was varied on the basis of learnt value. It is needless to say, however, that these arrangements may be applied simultaneously.

In the above embodiments, the throttle opening sensor 21 is used for detecting the accelerator operation speed. However, it is also possible to directly measure the degree of the accelerator pedal depression to obtain the accelerator pedal depression speed.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A lock-up control device for a torque converter in a vehicle, said torque converter comprising an input element connected to an engine which rotates according to a depression of an accelerator and an output element connected to an automatic transmission, said control device comprising:

a sensor for detecting a depression degree of the accelerator, a sensor for detecting a throttle opening, a sensor for detecting a vehicle speed, and a microprocessor programmed to:

determine whether or not the vehicle is coasting based on the depression degree of the accelerator, determine whether or not the torque converter is in a lock-up state wherein said input and output elements are directly combined, calculate an accelerator depression speed from the depression degree of the accelerator, shift the torque converter to the lock-up state when a lock-up condition holds, said lock-up condition including that the vehicle speed is in a predetermined lock-up speed range and the throttle opening is in a predetermined lock-up opening range, shift the torque converter to an unlock state, in which said input and output elements are indirectly combined, when an unlock condition holds, said unlock condition including that the accelerator is depressed at a speed larger than a predetermined speed after a state where the vehicle has been coasting at a speed within said predetermined lock-up speed range with a throttle opening within said predetermined lock-up opening range and the torque converter has been in the lock-up state, determine whether or not the vehicle speed is within a predetermined re-lock-up prevention speed range, and prevent the torque converter from shifting to the lock-up state, irrespective of the accelerator depression, as long as the vehicle speed is within the predetermined re-lock-up prevention speed range, after the torque converter has been shifted to the unlock state in said unlock condition, while allowing the torque converter to shift to the lock-up state after the torque converter has been shifted to the unlock state in a condition other than said unlock condition.

2. The lock-up control device as defined in claim 1, wherein the engine comprises a throttle which operates according to the depression of the accelerator, and the accelerator depression degree sensor comprises a sensor for detecting an opening of the throttle.

3. The lock-up control device as defined in claim 1, wherein the microprocessor is further programmed not to shift the torque converter to the lock-up state when the vehicle speed is less than the predetermined re-lock-up prevention speed range irrespective of the accelerator depression speed.

4. The lock-up control device as defined in claim 1, wherein the microprocessor is further programmed to calculate a time elapsed from when the torque converter was shifted from the lock-up state to the unlock state, and allow the torque converter to shift to the lock-up state when the elapsed time has reached a set time even when the vehicle speed is within the predetermined re-lock-up prevention speed range.

5. The lock-up control device as defined in claim 4 wherein the microprocessor is further programmed to learn an average speed of the accelerator depression after coasting of the vehicle, and modify the set time to a longer time when the average speed is larger than a standard value.

6. A lock-up control device for a torque converter in a vehicle, said torque converter comprising an input element connected to an engine which rotates according to a depression of an accelerator and an output element connected to an automatic transmission, said control device comprising:

means for detecting a depression degree of the accelerator, means for detecting a throttle opening, means for detecting a vehicle speed, and means for determining whether or not the vehicle is coasting based on the depression degree of the accelerator, means for determining whether or not the torque converter is in a lock-up state wherein said input and output elements are directly combined, means for calculating an accelerator depression speed from the depression degree of the accelerator, means for shifting the torque converter to the lock-up state when a lock-up condition holds, said lock-up condition including that the vehicle speed is in a predetermined lock-up speed range and the throttle opening is in a predetermined lock-up opening range, means for shifting the torque converter to an unlock state, in which said input and output elements are indirectly combined, when an unlock condition holds, said unlock condition including that the accelerator is depressed at a speed larger than a predetermined speed after a state where the vehicle has been coasting at a speed within said predetermined lock-up speed range with a throttle opening within said predetermined lock-up opening range and the torque converter has been in the lock-up state, means for determining whether or not the vehicle speed is within a predetermined re-lock-up prevention speed range, and means for preventing the torque converter from shifting to the lock-up state, irrespective of the accelerator depression as long as the vehicle speed has been within the predetermined re-lock-up prevention speed range, after the torque converter is shifted to the unlock state in said unlock condition, while allowing the torque converter to shift to the lock-tip state after the torque converter has been shifted to the unlock state in a condition other than said unlock condition.

* * * * *